US005961663A

United States Patent [19]

Schramm, Jr.

[11] Patent Number: 5,961,663

[45] Date of Patent: Oct. 5, 1999

[54] MICROWAVE-DRIED AMORPHOUS ALKALI METAL SILICATE POWDERS AND THEIR USE AS BUILDERS IN DETERGENT COMPOSITIONS

[75] Inventor: Charles John Schramm, Jr., Neshanic, N.J.

[73] Assignee: Colgate-Palmolive Co., New York, N.Y.

[21] Appl. No.: 08/902,434

[22] Filed: Jul. 29, 1997

Related U.S. Application Data

[63] Continuation-in-part of application No. 08/865,287, May 29, 1997, abandoned.

[51] Int. Cl.[6] .................................................... C01B 33/32

[52] U.S. Cl. ............................ 8/137; 423/332; 510/276; 510/357; 510/511; 510/531

[58] Field of Search ............................ 423/332; 510/511, 510/357, 531, 276; 252/FOR 160; 8/137

[56] References Cited

U.S. PATENT DOCUMENTS

| | | | |
|---|---|---|---|
| 3,450,494 | 6/1969 | Gaiser | 423/332 |
| 3,749,759 | 7/1973 | Freyhold et al. | 423/332 |
| 3,755,183 | 8/1973 | Fahn et al. | 423/332 |
| 3,879,527 | 4/1975 | Bertorelli et al. | 423/332 |
| 3,932,140 | 1/1976 | Jayawant et al. | 23/293 |
| 3,959,445 | 5/1976 | Jayawant et al. | 423/332 |
| 4,011,302 | 3/1977 | Defrawl | 423/332 |
| 4,022,704 | 5/1977 | Balfanz et al. | 423/332 |
| 4,118,333 | 10/1978 | Dugan et al. . | |

FOREIGN PATENT DOCUMENTS

| | | | |
|---|---|---|---|
| 4323527 | 7/1993 | Germany . | |
| 4400024 | 1/1994 | Germany . | |
| 19611013 | 12/1995 | Germany . | |
| 19601840 | 1/1996 | Germany . | |
| 2099412 | 12/1982 | United Kingdom | 423/332 |

*Primary Examiner*—Wayne Langel
*Attorney, Agent, or Firm*—Bernard Lieberman

[57] ABSTRACT

A microwave-dried amorphous alkali metal silicate detergent builder is provided characterized by a surface area of at least 20 $m^2$/gram and a water content of at least about 13%, by weight. The microwave-dried silicate provides effective complexation with hardness ion in wash water and more rapid solubility than conventional spray-dried silicate powders. The microwave-dried silicate can function as an efficient builder in laundry detergent compositions and over a broad range of laundry detergent applications.

11 Claims, No Drawings

MICROWAVE-DRIED AMORPHOUS ALKALI METAL SILICATE POWDERS AND THEIR USE AS BUILDERS IN DETERGENT COMPOSITIONS

This application is a continuation-in-part of prior application Ser. No. 08/865,287 filed May 29, 1997, abandoned, the disclosure of which is incorporated herein by reference.

FIELD OF THE INVENTION

This invention relates to amorphous alkali metal silicate powders having improved builder properties for detergent use. More particularly, this invention relates to microwave-dried amorphous silicate powders having an enhanced solubility in water and which are capable of providing improved complexation with hardness ion in wash water relative to conventional spray-dried powders. This invention also relates to laundry detergent compositions containing microwave-dried alkali metal silicate powders as effective builders.

BACKGROUND OF THE INVENTION

Alkali metal silicates are well-known in the art as effective detergent builders in aqueous wash solutions. Hardness ions such as calcium and magnesium tend to react with detergents and adversely affect their activity in the wash solution, hence, the removal of such hardness ions from the wash water is routinely effected by ion exchange with crystalline materials such as zeolite or by precipitation with builders which react with the hardness ions in the wash solution. Among the known builders which are particularly useful for removing calcium and magnesium ion from solution are alkali metal silicates in the form of liquids, amorphous silicates or crystalline silicates.

For liquid alkali silicates to exhibit effective builder activity, relatively concentrated solutions are required (greater than 10% w/w). Hence, in formulating aqueous liquid detergent products it is generally difficult to include the requisite amount of alkali metal silicate as a builder. As a practical matter, the high concentration of alkali silicate required in water precludes the ability to formulate concentrated liquid detergent products containing relatively large amounts of surfactant and silicate builder.

Crystalline layered alkali silicates have been extensively described in the patent literature as useful detergent builders (see, for example, U.S. Pat. Nos. 4,820,439; 4,806,327; and 4,950,310). These alkali silicates are characterized as having the ability to ion exchange their sodium ions with other metal or organic ions. Accordingly, they serve to remove hardness ions from wash water by sequestration and ion exchange. Unfortunately, however, the kinetics of such ion exchange is relatively slow at wash water temperatures below about 30° C., hence, these silicate materials have not been extensively incorporated into commercial detergent compositions.

Delivery of active alkali metal silicate in the form of an amorphous powder was heretofore only possible using spray-drying technology whereby a liquid silicate solution is spray-dried in a tower to form a powder spray-dried silicate. This type of silicate, however, is generally characterized by relatively low rates of solubility in wash water. Although, it can be used to enhance the bead strength of a spray-dried detergent powder, this type of powder silicate is for the most part destroyed as an effective detergent builder at temperatures above about 250° c., corresponding to typical spray-drying temperatures. Moreover, as compared to the present invention, the spray-dried silicate powders have lower ability to absorb liquid detergent components such as anionic or nonionic surfactants, a serious disadvantage with regard to the use of such silicate powders in non-tower methods of producing detergent compositions such as by agglomeration where high surfactant adsorption by powdered components is an important requirement.

Recently, other processes for producing amorphous alkali metal silicate have been described using alkali metal silicate glass as the starting material. In WO 95/06003, there is described a process of heating a mixture of molten sodium and/or potassium silicate glass and water to a temperature of about 300° to 400° C. to provide a foamed material that is processed into particles below about 20 microns. The particles thus formed are essentially anhydrous and generally ineffective as a builder material. An additional process step is, therefore, required whereby the water content is adjusted by hydration to a moisture of from about 0.5% to 15%, by weight, making it suitable as a detergent ingredient.

Microwave drying has been described in the prior art in connection with the manufacture of layered silicate. DE 4323527 assigned to Hoechst describes a process to produce sodium disilicate by heating silica and sodium hydroxide in a sealed chamber by microwave heating to a temperature of from 400° to 800° C.

SUMMARY OF THE INVENTION

In accordance with the present invention there is provided a microwave-dried alkali metal silicate detergent builder characterized by a surface area of at least about 20 $m^2$/gram, and a water content of at least about 13%, by weight, said alkali metal silicate builder being formed by drying an aqueous solution of said alkali metal silicate at ambient pressure by means of microwave radiant energy to a water content of at least about 13%, by weight.

The present invention is predicated on the discovery that alkali metal silicate which is formed by the microwave drying of an alkali metal silicate solution manifests improved builder properties such as a significantly improved solubility in water and enhanced water hardness complexation as compared to conventional spray dried silicate powder having a comparable ratio of $SiO_2$:$Na_2O$ and moisture content. The preferred alkali metal silicate is sodium silicate but potassium silicate is also useful for purposes of the invention.

Unlike the use of microwave drying to produce layered sodium silicate, such as discussed in the aforementioned DE4323527, the drying carried out in accordance with the present invention is at ambient pressure. More importantly, microwave-drying of an aqueous silicate solution as herein described does not produce an anhydrous alkali metal silicate powder, but rather provides only a partial drying of the aqueous solution such that it forms an alkali metal silicate powder which contains at least about 13% water and generally from about 13% to 20% water.

An important characteristic of the amorphous microwave-dried silicate described herein is a surface area of at least 20 $meters^2$/ gram. By way of comparison, the surface area of conventional spray-dried amorphous powder is about 2 $m^2$/g. This order of magnitude difference in surface area is theorized to account for the significantly enhanced solubility characteristics of, microwave dried sodium silicate powder in accordance with the invention relative to a conventional spray-dried sodium silicate powder. The enhanced rate of solubility in water is believed to directly affect the calcium ion complexation rate in the wash solution; the greater the solubility rate, the faster the complexation of calcium and other hardness ions. Thus, for example, the solubility of microwave dried sodium silicate as presently described exceeds the solubility of conventional spray-dried sodium silicate by a factor of about 4 to 5.

The present invention also provides a laundry detergent composition containing an effective amount of a microwave-dried alkali metal silicate as herein described and a process for laundering stained or soiled fabrics with such detergent composition.

DETAILED DESCRIPTION OF THE INVENTION

The starting material which is microwave dried to produce the alkali metal silicate builder of the invention is an aqueous slurry of alkali metal silicate. The alkali metal is preferably sodium but other alkali metals such as potassium may also be advantageously used. For purposes of convenience in describing the invention, the alkali metal silicate will often be referred to herein as sodium silicate, but it will be appreciated that other alkali metal silicates such as potassium silicate are also useful builders and manifest the same advantages as sodium silicate in terms of solubility in water and complexation with hardness ion relative to conventional spray-dried sodium or potassium silicate powder.

The aqueous sodium silicate slurry used as the starting material has a solids content of from about 35% to 44%, by weight corresponding to about 56% to 65%, by weight water. Drying of the solution is carried out by microwave heating for a period of time sufficient to achieve the desired water loss. An important characteristic of microwave heating which is observed when heating an aqueous sodium silicate solution in accordance with the present invention is that it cannot be dried to an anhydrous condition (namely, a water content of about 0%, by weight) regardless of the time of heating. Thus, if an aqueous silicate solution is allowed to dry by microwave heating until no further weight loss is recorded, the final water content will be no less than about 13%, by weight water. If microwave dried silicate were to be further dried in a high temperature convection oven to an anhydrous condition for purposes of comparison, the resulting sodium silicate material would have practically no ability to complex with calcium ion. Generally, drying of the aqueous solution by microwave heating is carried out until a water content of from about 13% to 20%, by weight, is achieved. At water contents above about 20%, by weight, the powdered silicate generally becomes difficult to handle and transport from a practical standpoint, although its solubility characteristics are improved relative to a silicate powder having a lower moisture content.

Liquid sodium silicate solutions useful for the invention have a ratio of $SiO_2$:$Na_2O$ of from about 1.6:1 to about 2:1 in order to maintain desirable hardness ion complexation properties. A $SiO_2$:$Na_2O$ ratio of about 1.8:1 is preferred from the standpoint of detergency for microwave-dried silicates having a water content of about 20%, by weight; at water contents of silicate of about 13%, by weight, a ratio of about 1.6:1 is preferable.

Heating of the aqueous alkali metal silicate solution or slurry by microwave radiant energy is a critical aspect of the invention. Exposure to microwave heating can be measured in kW-minutes, i.e, the power output in kW multiplied by the number of minutes of exposure. Generally, for 250 grams 43% solids silicate solution, exposures of from about 15 to 20 kW-minutes will provide microwave-dried silicate powder in accordance with the present invention.

The microwave-dried alkali metal silicate of the invention is intended for use in conjunction with a detergent composition, preferably a powder laundry detergent composition. For most applications, the level of microwave-dried sodium silicate in the detergent powder is from about 6% to about 15% by weight. An anionic surfactant, preferably a linear alkyl benzene sulfonate is advantageously present in the range of about 12% to 25%, by weight, and a nonionic surfactant, if present in the detergent composition as part of a mixed surfactant system is typically in the range of about 1 to 15%, by weight.

The level and type of builders (apart from the microwave-dried silicate) which are typically present in a laundry detergent product in accordance with the invention will vary depending on whether a no-phosphate or a phosphate-containing product is formulated. For a no-phosphate product which typically contains sodium carbonate as the principal builder, the level of such sodium carbonate may be in the range of about 11% to 40%, by weight. For a phosphate-containing detergent product, the level of phosphate builder, typically sodium tripolyphosphate, is generally present in amounts up to 25%, by weight, with up to about 15%, by weight of sodium carbonate, if desired, as a co-builder. Enzymes and enzyme mixture selected from among protease, amylase, lipase and cellulase enzymes are advantageously present from about 0 to 3%, by weight.

For most laundry applications, the total amount of soluble sodium silicate delivered to the wash solution is from about 0.06 to 1.4 grams/liters.

Suitable anionic surfactants for use in a detergent composition of the invention include the water-soluble alkali metal salts having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher ($C_8$–$C_{18}$) alcohols produced, for example, from tallow or coconut oil; sodium and potassium alkyl ($C_9$–$C_{20}$) benzene sulfonates, particularly sodium linear secondary alkyl ($C_{10}$–$C_{15}$) benzene sulfonates; sodium and potassium salts of sulfuric acid esters of higher ($C_8$–$C_{18}$) fatty alcohol-alkylene oxide, particularly ethylene oxide reaction products; alkane monosulfonates such as those derived from reacting alpha-olefins ($C_8$–$C_{20}$) with sodium bisulfite and those derived from reacting paraffins with $SO_2$ and $Cl_2$ and then hydrolyzing with a base to produce a random sulfonate; and olefin sulfonates which term is used to describe the material made by reacting olefins, particularly $C_{10}$–$C_{20}$ alpha-olefins, with $SO_3$ and then neutralizing and hydrolyzing the reaction product. Among the preferred anionic surfactants are ($C_{10}$–$C_{18}$) alkyl polyethoxy (1–11 EO) sulfates.

Suitable nonionic surfactants include, in particular, the reaction products of compounds having a hydrophobic group and a reactive hydrogen atom, for example aliphatic alcohols, acids, amides and alkyl phenols with alkylene oxides, especially ethylene oxide, either alone or with propylene oxide. Specific nonionic surfactant compounds are alkyl ($C_6$–$C_{18}$) primary or secondary linear or branched alcohols condensed with ethylene oxide, and products made by condensation of ethylene oxide with the reaction products of propylene oxide and ethylenediamine. Other nonionic surfactant compounds include long chain tertiary amine oxides, long-chain tertiary phosphine oxides, dialkyl sulfoxides, fatty ($C_8$–$C_{18}$) esters of glycerol, sorbitan and the like, alkyl polyglycosides, ethoxylated glycerol esters, ethoxylated sorbitans and ethoxylated phosphate esters.

The preferred non-ionic surfactant compounds are those of the ethoxylated and mixed ethoxylated-propyloxylated ($C_6$–$C_{18}$) fatty alcohol type, containing 2–11 EO groups.

The detergent compositions may contain one or more detergency builders which may include phosphates such as alkali metal polyphosphates, and alkali or alkaline earth metal silicates, carbonates, and bicarbonates, as well as water-insoluble aluminosilicate zeolite, such as zeolite A. Sodium tripolyphosphate is especially preferred but other phosphate builders such as tetrasodium pyrophosphate can also be used. Mixtures of sodium tripolyphosphate and sodium carbonate as disclosed in U.S. Pat. No. 4,842,769 are also useful.

The zeolites useful in the present invention include the crystalline, amorphous and mixed crystalline-amorphous zeolites of either natural or synthetic origin. It is preferred that the zeolites rapidly and effectively counteract hardness cations, such as calcium, magnesium, iron and the like to soften the wash water before such hardness ions adversely react with any other components of the detergent composition.

The preferred zeolites have a high calcium ion exchange capacity, normally from about 200 to 400 or more, milliequivalents of calcium carbonate hardness per gram of the aluminosilicate ("meq./g."). It is preferred that the zeolite used has a calcium capacity between about 250 to 350 meq./g.

Although other ion exchanging zeolites may also be utilized, the finely divided synthetic zeolite builder particles preferred in the practice of this invention will have the formula $$(Na_2O)_x(Al_2O_3)_y(SiO_2)_z.wH_2O$$

wherein x is 1, y is from 0.8 to 1.2 (preferably about 1), z is from 1.5 to 3.5 (preferably 2 to 3, and more preferably about 2) and w is from 0 t 9 (preferably 2.5 to 6).

The water insoluble crystalline aluminosilicates used are often characterized by having a network of substantially uniformly sized pores in the range of about 3 to 10 Angstroms, often being about 4 Å (normal). This size is determined by the unit structure of the zeolite crystal. The zeolite should be an univalent cation-exchanging zeolite, i.e., it should be an aluminosilicate of an univalent cation such as sodium, potassium, lithium (when practicable) or other alkali metal, ammonium or hydrogen. Preferably, the univalent cation of the zeolite molecular sieve is an alkali metal cation, preferably sodium or potassium and most preferably sodium. However, other cations are also useful.

Crystalline zeolites that are good ion exchangers for use in the invention, at least in part, include zeolites of the following crystalline structure groups: A, X, Y, L, mordenite and erionite. The A, X and Y types are preferred. These crystalline types of zeolites are well-known in the art and are described in *Zeolite Molecular Sieves* by Donald W. Beck, published in 1974 by John Wiley & Sons. Typical commercially available zeolites of the types mentioned above are listed in Table 9.6, at pages 747–749, of the Beck text, which table is incorporated herein by reference.

EXAMPLE 1

Preparation of Microwave-Dried Sodium Silicate Powders

Two sodium silicate powders were prepared as described below having water contents of 20% and 13%, by weight, respectively. The sodium silicate solutions were microwave-dried in a Quasar, Lifestyle II, model MQ5566AH microwave oven. The high power setting was used. Small quantities of sodium silicate solution were dried in six inch diameter porcelain drying dishes; larger quantities were dried in 7 inch by 11 inch Pyrex baking trays.

(A) Sodium Silicate having 20% Final Water Content and 1.6:1 ratio of $SiO_2$:$Na_2O$ A drying dish was tared on a Mettler PM2000 balance. Fifty grams of sodium silicate solution, 1.6:1 $SiO_2$:$Na_2O$, 42.6% solids content, was placed into the porcelain drying dish. The sodium silicate contained 21.28 grams of solids. For a 20% final water content, the final sample weight was calculated to be 26.59 grams. The sample weight measured periodically as shown below.

| Cumulative Drying Time | Weight |
|---|---|
| 2 minutes | 38.19 grams |
| 2 minutes, 30 seconds | 34.25 grams |
| 3 minutes | 30.82 grams |
| 3 minutes, 20 seconds | 28.80 grams |
| 3 minutes, 30 seconds | 28.20 grams |
| 3 minutes, 40 seconds | 27.66 grams |
| 3 minutes, 50 seconds | 27.31 grams |
| 4 minutes | 26.95 grams |

After 4 minutes, the sample was removed from the microwave oven and allowed to cool at room temperature for 30 minutes, and then ground and sieved using a 20 mesh (840 microns) sieve.

(B) Sodium Silicate Having 13% Final Water Content and 1.6:1 ratio of $SiO_2$:$Na_2O$ A pyrex baking dish as measured on a Mettler PM2000 balance had an initial weight of 1128.50 grams. 250 grams of sodium silicate solution, 1.6:1 $SiO_2$:$Na_2O$, 42.6% solids content, was placed into the baking dish. The sodium silicate contained 106.5 grams of solids. For a 13% final water content, the final sample weight was calculated to be 122.41 grams. The final weight of dish and sample at the 13% water content was calculated to be 1250.9 grams. The sample weight was measured periodically as shown below.

| Cumulative Drying Time | Weight |
|---|---|
| initial | 1378.5 grams |
| 28 minutes | 1293.4 grams |
| 30 minutes | 1280.5 grams |
| 32 minutes | 1270.3 grams |
| 34 minutes | 1262.2 grams |
| 36 minutes | 1255 grams |
| 38 minutes | 1251 grams |
| 40 minutes | 1251 grams |

After 40 minutes, the sample was removed from the microwave oven and allowed to cool at room temperature for 1 hour, and then ground and sieved using a 20 mesh (840 microns (sieve)

EXAMPLE 2

Measurement of Solubility Rate

Experiments were carried out to evaluate the dissolution rate of various sodium silicate powders in accordance with the invention and one spray-dried silicate powder outside the invention. The solubility rate of each powder was monitored by light transmittance. Higher transmittance (less light blockage) indicates more complete dissolution. Light transmittance was monitored by a Mettler DP660 phototrode attached to a Mettler DL25 auto titrator. Samples were stirred at medium speed (4), and were prepared by introducing 0.8 grams of sodium silicate into 80 ml deionized water. All measurements were at room temperature.

(A) The Solubility of Microwave-Dried Sodium Silicate Powders Having 13% Water Content and Varying Contents of Silicate Four microwave-dried sodium silicate powders were prepared having a 13% water content and rations of $SiO_2$:$Na_2O$ of 1.6:1; 1.8: 1; 2.0: 1; and 2.4: 1, respectively. The solubility rates were measured as described above, the Table below providing the values of light transmittance as a function of time for each of the four samples.

| Time | Ratio of $SiO_2$:$Na_2O$ | | | |
|---|---|---|---|---|
| (minutes) | 1.6:1 | 1.8:1 | 2.0:1 | 2.4:1 |
| 1 | 99 | 62.6 | 48.6 | 56.5 |
| 2 | 100 | 73.8 | 65.5 | 57.3 |
| 3 | 100 | 82.9 | 75.8 | 58 |
| 4 | 100 | 87 | 81 | 59.2 |
| 5 | 100 | 90.5 | 85 | 60 |
| 6 | 100 | 92.7 | 88 | 60.5 |
| 7 | 100 | 94.4 | 90.4 | 61.4 |
| 8 | 100 | 95.2 | 91.1 | 62.4 |
| 9 | 100 | 96 | 92.8 | 62.9 |
| 10 | 100 | 96.6 | 93.4 | 64 |

The data indicates the high transmittance values and, hence, the rapid solubility within 2 minutes of the sample having a ratio of 1.6:1. The samples having $SiO_2$:$Na_2O$ ratio of 1.8 to 1 and 2 to 1 were also rapidly soluble after about 10 minutes albeit not as soluble as the 1.6 to 1 sample. The sample have a ratio of 2.4:1 was markedly less soluble at the end of 10 minutes of measurement.

(B) The Solubility of Microwave-Dried Versus Spray-Dried Sodium Silicate Powders A microwave-dried sodium silicate powder and a spray-dried powder (in accordance with prior art) were prepared, each having a molar ratio of $SiO_2$:$Na_2O$ of 2:1. The water content of the microwave-dried sample was 20%, by weight, and the water content of the spray-dried sample was 18%, by weight. The solubility rates were measured as described above with the Table below providing the values of light transmittance as a function of time.

| Time (minutes) | Spray-Dried | Microwave-Dried |
|---|---|---|
| 0.25 | 48.1 | 49.8 |
| 1 | 57.8 | 83.4 |
| 1.5 | 62.7 | 91.6 |
| 2.25 | 63.9 | 95.7 |
| 2.5 | 62.5 | 97.1 |
| 3 | 67.8 | 97.9 |
| 4 | 69.9 | 98.4 |
| 5 | 71.9 | 98.7 |
| 6 | 74.3 | 98.8 |
| 7 | 75.6 | 98.8 |
| 8 | 78 | 98.8 |
| 9 | 80.5 | 98.8 |
| 10 | 82.6 | 98.8 |

As noted in the Table, the microwave-dried sample was effectively dissolved within 2–3 minutes. The spray-dried sample of the prior art was substantially less soluble.

(C) The Solubility of Microwave-Dried Sodium Silicate Powder As a Function of Water Content Three microwave-dried sodium silicate powders were prepared having water contents of 20%, 13% and 0%, by weight, respectively. The sample having 0% water content was a sample not in accordance with the invention insofar as it was prepared by modifying a microwave-dried powder by heating in a convection oven at a temperature above 300° C., a microwave-dried powder having a 13% water content until the powder was anhydrous. The solubility rates were measured as described above, the Table below providing the values of light transmittance as a function of time.

| Time | Water Content | | |
|---|---|---|---|
| (minutes) | 20% $H_2O$ | 13% $H_2O$ | 0% $H_2O$ |
| 0.25 | 95.1 | 44.5 | 10 |
| 1 | 96.5 | 62.6 | 10.1 |
| 2 | 97 | 73.8 | 10.4 |
| 3 | 100 | 82.9 | 10.5 |
| 4 | 100 | 87 | 10.5 |
| 5 | 100 | 90.5 | 10.5 |
| 6 | 100 | 92.7 | 10.8 |
| 7 | 100 | 94.4 | 10.8 |
| 8 | 100 | 95.2 | 10.8 |
| 9 | 100 | 96 | 10.8 |
| 10 | 100 | 96.6 | 11.4 |

The sample having 20 5 water content was dissolved within 3 minutes, and the sample having 13% water content was dissolved within 10 minutes, a solubility rate considered acceptable for laundry detergent applications. The sample having 0% water content (which was not in accordance with the invention) was barely soluble in water after 10 minutes, an unacceptable rate of solubility for most laundry detergent applications.

EXAMPLE 3

Experiments were carried out to measure the complexation of calcium ion ($Ca^{2+}$) for various microwave-dried samples of sodium silicate in accordance with the invention and one spray-dried powder sample in accordance with the prior art. Complexation was measured with an Orion model 93-20 calcium ion electrode and model 90-01 reference electrode combination attached to an Orion EA 940 ion analyzer. The instrument was set to measure in ppm Ca ion. All measurements were taken at room temperature. The electrodes were placed into 100 ml of solution containing an initial calcium ion concentration of 100 ppm while stirring the solutions. For each experiment, the powdered sodium silicate sample was added at time 0 at a level of 0.4 grams/L.

(A) Complexation of Spray-Dried Sodium Silicate Powder Versus Microwave-Dried Powder Two microwave-dried sodium silicate powders in accordance with the invention were prepared as described above having 13% water content and 20% water content, respectively, and a molar ratio of $SiO_2$:$Na_2O$ of 2.0:1. There was also prepared a spray-dried sodium silicate powder (in accordance with prior art) having a water content of 18%, by weight, and an $SiO_2$:$Na_2O$ ratio of 2.0:1. The complexation rates of each sample were measured as a function of time, the Table below providing values of free calcium ion concentration as described above.

| Time (minutes) | Spray-Dried Powder 18% $H_2O$ | Microwave-Dried Powder 20% $H_2O$ | 13% $H_2O$ |
|---|---|---|---|
| 0 | 100 | 100 | 100 |
| 0.25 | 98.9 | 80 | 90.8 |
| 0.5 | 90.7 | 57.7 | 68.2 |
| 0.75 | 82.6 | 47.4 | 48 |
| 1 | 72.3 | 43.5 | 37.9 |
| 1.25 | 67.5 | 40.2 | 33.2 |
| 1.5 | 61.8 | 37.65 | 32.2 |
| 1.75 | 59 | 36 | 31.9 |
| 2 | 57.2 | 36.6 | 32.4 |
| 2.25 | 56.7 | 36.9 | 33.2 |
| 2.5 | 55.4 | 38.5 | 34.1 |
| 2.75 | 55.8 | 40.2 | 35.2 |
| 3 | 56.3 | 41.3 | 36.7 |

As noted in the Table, both of the microwave-dried sodium silicate samples provided rapid and effective calcium ion complexation within 3 minutes. The spray-dried sodium silicate was markedly less effective to complex hardness ion.

(B) Complexation of Microwave-Dried Sodium Silicate Powders Having 13% Water Content and Varying Contents of Silicate Four microwave-dried sodium silicate powders were prepared having a 13% water content and ratios of $SiO_2$:$Na_2O$ of 1.6:1; 2.0:1; 2.4:1; and 3.2:1. The complexation of calcium ion was measured as described above for each sample as a function of time, the Table below providing values of free calcium ion concentration.

| Time (minutes) | Ratio of $SiO_2$:$Na_2O$ 1:6:1 | 2.0:1 | 2.4:1 | 3.2:1 |
|---|---|---|---|---|
| 0 | 100 | 100 | 100 | 100 |
| 0.25 | 70 | 86.8 | 98.3 | 91.3 |
| 0.5 | 42.2 | 56.9 | 96.7 | 93.6 |
| 0.75 | 34.9 | 43.3 | 91.2 | 93.6 |
| 1 | 32.7 | 36.7 | 87.5 | 95.2 |
| 1.25 | 32.9 | 34.1 | 82.6 | 95.2 |
| 1.5 | 34.1 | 33.5 | 78.6 | 94.4 |
| 1.75 | 35.1 | 34.6 | 75.4 | 94.4 |
| 2 | 36.1 | 35.8 | 71.8 | 93.6 |
| 2.25 | 37.9 | 36.7 | 69.4 | 93.6 |
| 2.5 | 38.9 | 38.6 | 67.7 | 92.8 |
| 2.75 | 40.2 | 40.2 | 65 | 91.3 |
| 3 | 41.5 | 41.5 | 63.4 | 91.3 |

As noted from the data above, the complexation provided by silicate samples having ratios of 1.6:1 and 2:1 was rapid and efficient within a period of three minutes. For those samples having a higher silica content the rate of complexation was significantly lower.

EXAMPLE 4

The following experiments were conducted to compare the performance of a laundry detergent composition in accordance with the prior art (Control) using a spray-dried sodium silicate builder versus a detergent composition in accordance with the present invention (Composition B) which is otherwise identical thereto except for the presence of microwave-dried sodium in place of the spray-dried silicate.

The Control composition and Composition B are shown in the Table below:

| Component | Compositions (Weight Percent) Control | B |
|---|---|---|
| Linear Sodium Alkyl Benzene Sulfonate | 21.5% | 21.5% |
| Sodium Tripolyphosphate | 22.0 | 22.0 |
| Sodium Carbonate | 11.0 | 11.0 |
| Microwave-dried Sodium Silicate | — | 6.1 |
| Spray-dried Sodium Silicate | 6.1 | — |
| Sodium Sulfate | 28.0 | 28.0 |
| Nonionic Surfactant | 1.0 | 1.0 |
| Enzymes | 0.35 | 0.35 |
| Water | 10.0 | 10.0 |

Detergency evaluations were carried out using the Control and Composition B (defined above) in a standard U.S. washing machine. Washes were in 65 liters of tap water (100 ppm hardness) at 77° F. Each detergent composition was used at a level of 2.5 grams per liter. The soil/fabric combinations which were used in the detergency evaluation are listed below:

1. Blood/Milk/Ink on Cotton
2. Spangler sebum particulate on cotton
3. Mineral Oil on Cotton
4. Grape juice on polyester/cotton 65/35
5. Chocolate fudge pudding on polyester/cotton 65/35
6. Piscataway clay on cotton
7. Liquid makeup on polyester/cotton 65/35

For each soil/fabric combination, three separate swatches were added to each wash to check on the reproducibility of the results. The average result for the three replicates was used. Following washing, the swatches were air dried and evaluated on a Hunter Ultra Scan XE tristimulus reflectometer. The whitness and color of the swatches were calculated using the Hunter Lab, CIE L*, a*, b* scale. L* measures lightness and varies from 100 for perfect white to 0 for perfect black, approximately as noted by the human eye. The data provided in the Table below represents ΔL* or the difference in the measured L* values for Composition B (containing microwave-dried silicate) minus the measured value for the Control composition (containing spray-dried silicate).

| Soil/Fabric | ΔL* (B minus Control) |
|---|---|
| 1. Blood/Milk/Ink on Cotton | +0.1 |
| 2. Spangler Sebum Particulate | +0.1 |
| 3. Mineral Oil on Cotton | +1.8 |
| 4. Grape Juice on Polyester/Cotton 65/35 | +1.0 |
| 5. Chocolate Fudge Pudding on Polyester/Cotton 65/35 | +1.2 |
| 6. Piscataway Clay on Cotton | +3.8 |
| 7. Liquid Makeup on Polyester/Cotton 65/35 | +1.4 |

Based on the data above, the detergent composition of the invention provided significantly improved soil removal over a broad range of stain/fabric combinations relative to a Control composition of the prior art.

What is claimed is:

1. A microwave-dried amorphous alkali metal silicate detergent builder characterized by a surface area of at least about 20 $m^2$/gram, and a water content of at least about 13%, by weight, said alkali metal silicate builder being formed by drying an aqueous slurry consisting of said alkali metal silicate at ambient pressure and at a temperature of at least 212° F. by means of microwave radiant energy to a water content of at least about 13%, by weight.

2. A microwave-dried alkali metal silicate builder in accordance with claim 1 having a molar ratio of $SiO_2$ to $Na_2O$ of from about 1.6 to about 2.

3. A microwave-dried alkali metal silicate builder in accordance with claim 1 having an average particle size of from about 150–300 microns.

4. A microwave-dried alkali metal silicate builder in accordance with claim 1 characterized by a water content of from about 13% to about 20%, by weight.

5. A microwave-dried alkali metal silicate builder in accordance with claim 1 wherein the initial water content of the aqueous slurry which is dried by microwave energy is from about 56% to 65%, by weight.

6. A microwave-dried alkali metal silicate builder in accordance with claim 1 wherein the alkali metal is sodium.

7. A laundry detergent composition containing as a detergent builder a microwave-dried alkali metal silicate as defined in claim 1.

8. A laundry detergent composition as in claim 7 which comprises from about 6% to about 15%, by weight of said microwave-dried alkali metal silicate.

9. A laundry detergent composition as in claim 8 which further comprises from about 12% to about 25% of an anionic surfactant.

10. A laundry detergent composition as in claim 9 wherein said anionic surfactant is a linear alkyl benzene sulfonate.

11. A process for laundering stained or soiled fabrics which comprises contacting the fabrics to be laundered with a wash solution containing an effective amount of a laundry detergent composition in accordance with claim 7.

* * * * *